Figure 1:
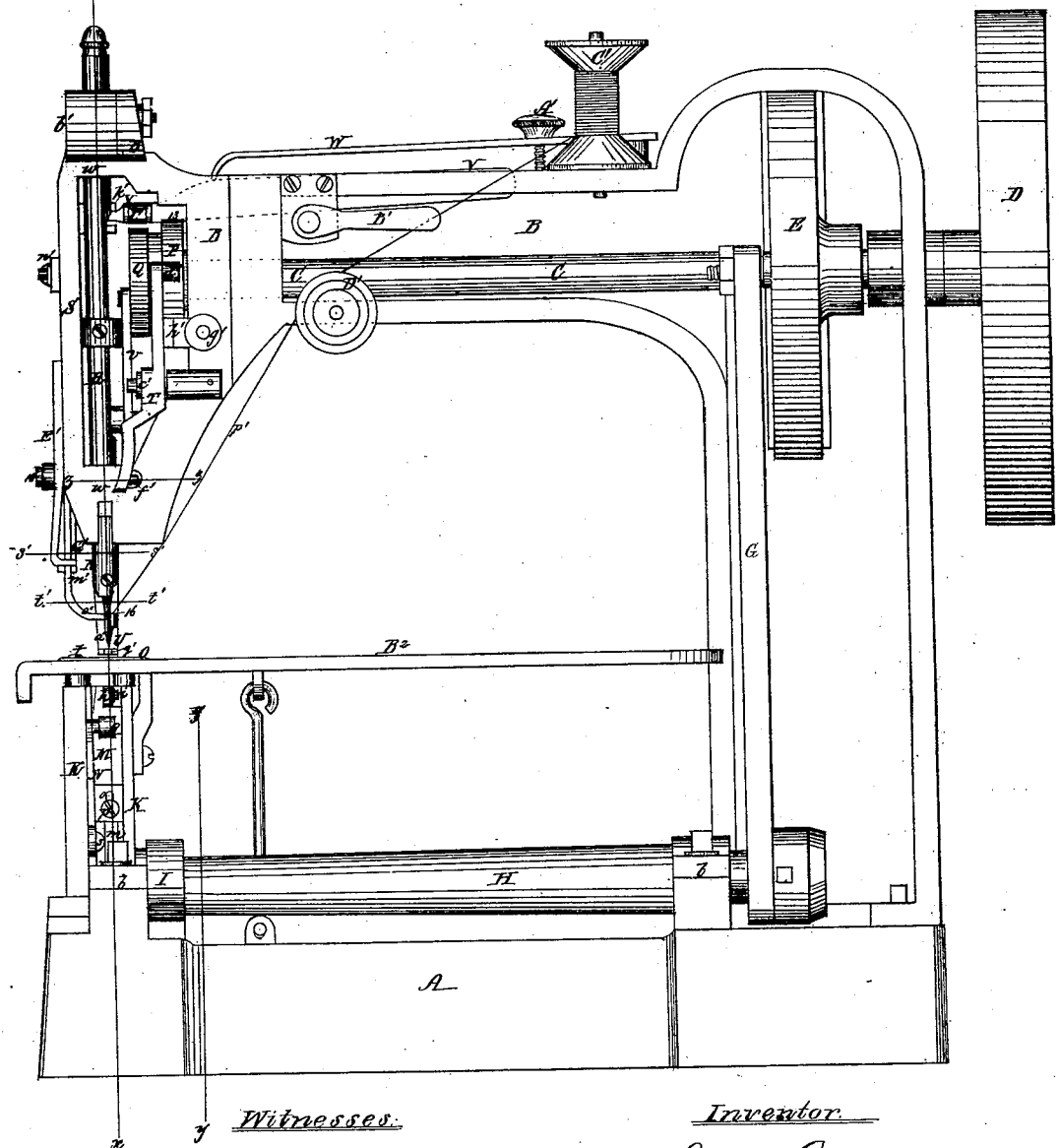

5 Sheets—Sheet 1.

E. A. KIMBALL.
Sewing Machine.

No. 111,752.

Patented Feb. 14, 1871.

Witnesses:

Inventor

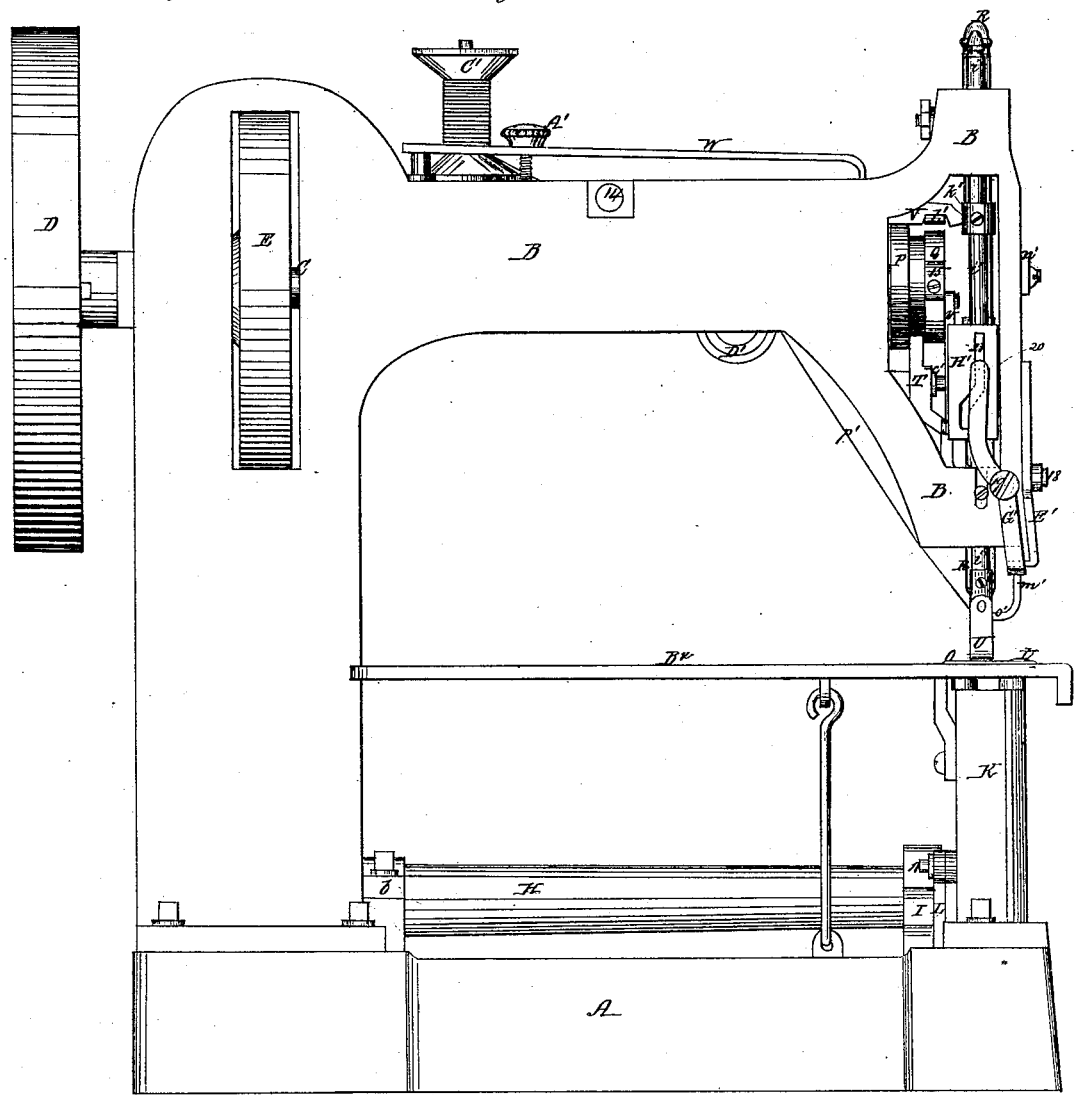

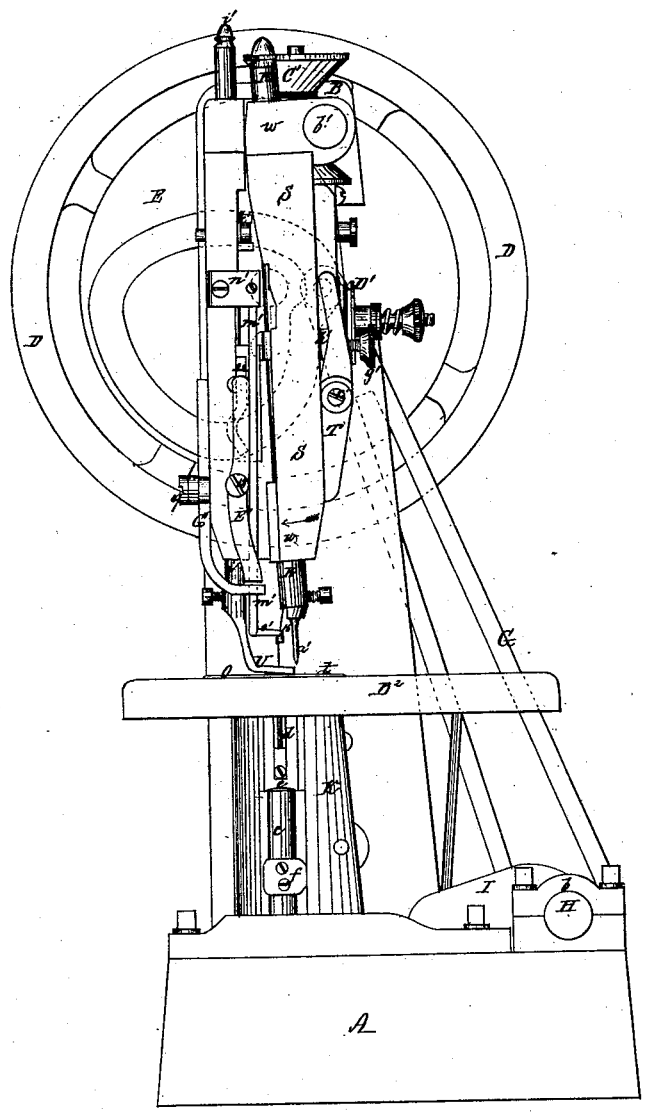

5 Sheets—Sheet 4.
E. A. KIMBALL.
Sewing Machine.
No. 111,752.     Patented Feb. 14, 1871.
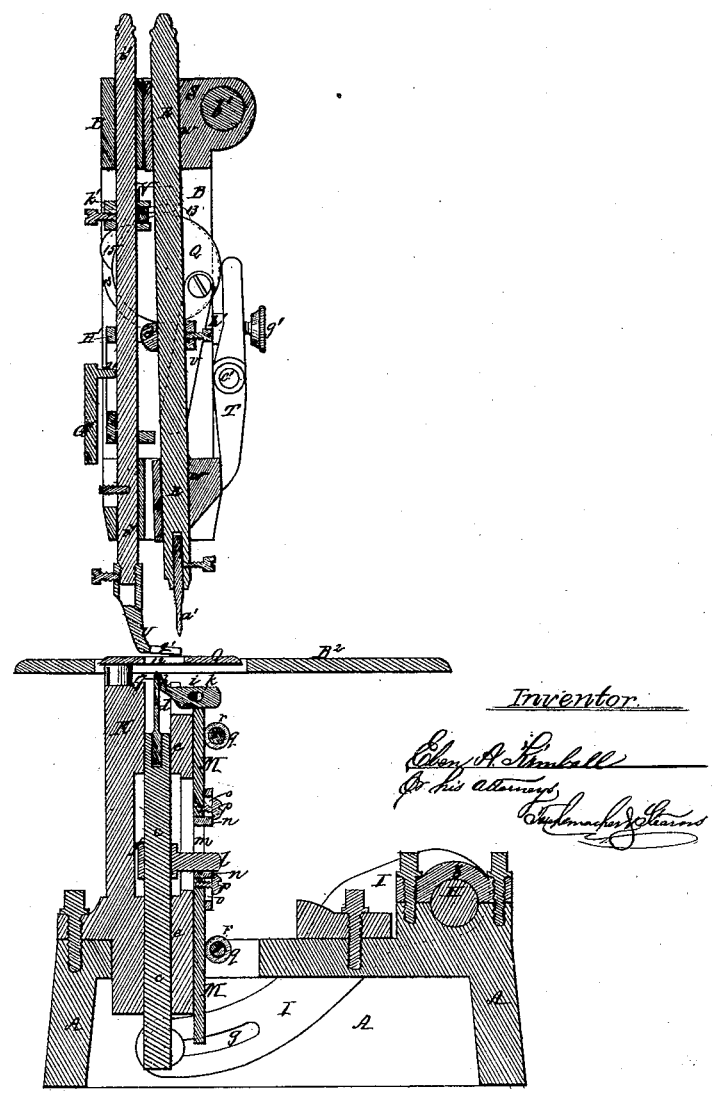

5 Sheets—Sheet 5.
E. A. KIMBALL.
Sewing Machine.
No. 111,752.
Patented Feb. 14, 1871.
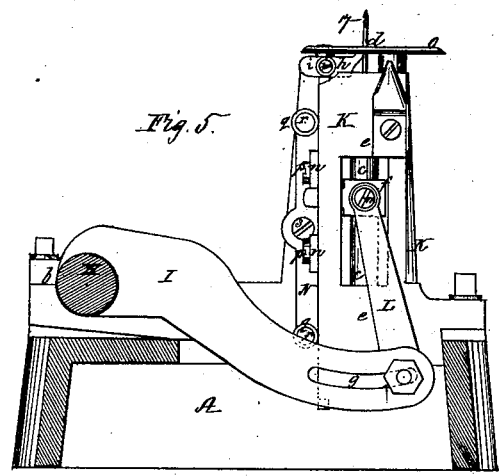
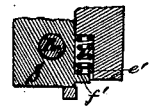
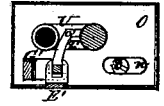
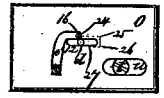
Witnesses
Inventor.

UNITED STATES PATENT OFFICE.

EBEN A. KIMBALL, OF ABINGTON, MASSACHUSETTS.

IMPROVEMENT IN SEWING-MACHINES.

Specification forming part of Letters Patent No. 111,752, dated February 14, 1871.

*To all whom it may concern:*

Be it known that I, EBEN A. KIMBALL, of Abington, in the county of Plymouth and State of Massachusetts, have invented certain Improvements in Chain-Stitch Wax-Thread Sewing-Machines, of which the following is a full, clear, and exact description, reference being had to the accompanying drawing, making part of this specification, in which—

Figure 1 is a front elevation of a chain-stitch wax-thread sewing-machine with my improvements applied thereto. Fig. 2 is a rear elevation, and Fig. 3 is an end elevation, of the same. Fig. 4 is a vertical transverse section on the line $x\ x$ of Fig. 1. Fig. 5 is a vertical transverse section on the line $y\ y$ of Fig. 1. Fig. 6 is a horizontal section on the line $z\ z$ of Fig. 1. Fig. 7 is a horizontal section on the line $s'\ s'$ of Fig. 1. Fig. 8 is a horizontal section on the line $t'\ t'$ of Fig. 1.

In that class of chain-stitch wax-thread sewing-machines as heretofore constructed, where an awl is employed, the thread-guide is made to vibrate partially around the needle, causing the thread to be drawn in contact with the edges of the slot of the presser-foot, which removes the wax and injures the thread, so that it is frequently broken, and consequently a sufficient degree of tension cannot be given the thread to produce a tight stitch, as required.

Furthermore, when the feed is taking place the thread is held by the guide in front of the needle, causing the thread to be drawn against the tension, and requiring a spring to take up the slack produced by the back movement of the thread-guide.

The first part of my invention has for its object to overcome the above-mentioned difficulties; and consists in operating the thread-guide in such manner that the thread will be carried partially around the needle without coming in contact with the corners of the presser-foot, and will be held back of the needle while the material is being fed, preventing the thread from being drawn against the tension, and enabling me to dispense with the take-up spring heretofore employed, as no more thread will be drawn from the tension-wheel than is absolutely required to make the stitch, while at the same time the stitches, as soon as formed, may be readily seen by the operator, which is not the case where the thread-guide is in front of the needle.

My invention also consists in a cast-off provided with a slot and screw, by which it may be adjusted to needles of varying sizes, so that the inner surface of the cast-off may bear evenly and squarely against the front side of the needle and completely close its hook, to prevent the escape of the thread therefrom; and my invention also consists in a mechanism by which the descent of the needle may be varied without changing the length of its throw upward, in order that the distance to which the loop is drawn may correspond with the length of the stitch, and the cast-off be always carried up into contact with the under side of the material being sewed, without regard to the length of the loop, which is essential in order that the loop may be shielded from the hook of the needle in its downward course; and my invention also consists in a spring provided with one or more rollers, for producing a uniform friction on the cast-off bar, and thereby preventing the cast-off from descending by its own weight or by the friction of the needle against it.

My invention also consists in an adjustable throat-plate, by which the front end of the throat may be brought as close as possible to the path of the awl without interfering therewith, whereby a firm bearing for the material is insured when the awl is in the act of entering it, and the material is prevented from being displaced.

To enable others skilled in the art to understand and use my invention, I will proceed to describe the manner in which I have carried it out.

In the said drawing, A is the bed, and B the frame or neck, of the machine, in suitable bearings in which runs the driving-shaft C, which carries at its outer end the driving-pulley or fly-wheel D, and within the framework the needle-cam E, which vibrates the long arm G, the lower end of which is secured to one end of a horizontal rock-shaft, H, having its bearings at $b\ b$, and to the opposite end of this shaft is secured a curved arm, I, which operates the needle-bar $c$ and parts connected therewith, as will be presently explained.

K is a post rising from the bed A. This post is slotted or cut away for the reception of the needle-bar $c$, which carries the needle $d$, and slides vertically in bearings $e\ e$.

To a block, $f$, on the needle-bar is pivoted one end of a connecting-rod, L, the other end of which is secured to the arm I, and is made adjustable in a curved slot, $g$, the curve of which is struck from the point 11 as a center when the arm I and needle-bar c are at the highest point of their stroke, and thus, through the connections described, as the driving-shaft is revolved, the required vertical movements are imparted to the needle.

The groove in the needle-cam E is of such form that the needle will be slightly raised after the completion of its downward stroke, for the purpose of slackening the loop at the time of the feed, and preventing any unnecessary strain thereon, which lessens the liability of springing the awl or puckering a soft or flimsy material, and insures the carrying of the material into such a position that the needle will enter the hole previously made by the awl.

h is the "cast-off," which passes between the loop and the needle, for the purpose of shielding the loop from the hook of the needle in its downward course, in a well-known manner.

The cast-off h is secured to the cast-off bar M by a screw, i, passing through a slot, k, whereby the cast-off may be adjusted to needles of various sizes, so that its inner surface may always bear evenly and squarely against the front side of the needle, and completely close its hook to prevent the escape of the thread therefrom, and perfectly shield the loop previously made from the hook of the needle.

The required movements are imparted to the cast-off by means of an arm or driver, l, projecting from the block f on the needle-bar, this arm l passing through a slot in the post K, and another slot, m, in the cast-off bar, and striking alternately against dogs n n, which are made adjustable by slots o and screws p, so that the length of the stroke of the cast-off may be varied, as required.

By means of the curved slot g the throw of the needle-bar may be readily varied in such a manner that while the needle will always be raised to the same height, the length of its downward stroke will be changed, so that the distance to which the loop is drawn below the under surface of the leather will correspond to the length of stitch desired, and the cast-off be always carried up into contact with the under side of the material being sewed, without regard to the length of the loop, which is essential, in order that the loop may be shielded from the hook of the needle in its downward course.

The cast-off bar is prevented from falling by its own weight, or by the friction of the needle against it, or by means of friction-rolls q on studs r, projecting from a spring, N, which is secured to the post K by a screw, s, passing through a slot; and by adjusting this spring the degree of friction produced by the roll may be regulated as desired, while the rolls themselves will produce very little wear upon the face of the cast-off bar.

The spring N may be provided with one friction-roll only, instead of two, if desired.

O is the throat-plate, which is secured to posts rising from the top of the post K, and is made adjustable longitudinally by the screw t and slot u. The tops of two of the posts that support the throat-plate are grooved, so that they resemble inverted truncated cones, and the throat-plate is grooved to engage with and be held down by the tops of these posts, and by this construction, when the feed is changed, the end of the throat or slot 12 may be brought as near as possible to the path of the awl without interfering therewith, by which means a firm bearing is insured for the leather on the entrance of the awl, and the leather is prevented from being displaced thereby.

B$^2$ is a removable plate or table, which serves to support the material being sewed, and this table is provided with a slot or opening of sufficient size to admit the throat-plate O and allow of its being adjusted.

I will now describe the manner in which the awl, presser-foot, and thread-guide are operated.

To the end of the driving-shaft C, opposite to the pulley D, is secured a double cam, P Q, to the face of which is pivoted a connecting-rod, v, the opposite end of which is pivoted to the awl-shaft R, which slides in bearings w in the plate S, and carries at its lower end the awl a', and thus as the driving-shaft is revolved the awl is moved up and down at the required times to make the holes in the leather for the needle to pass through.

The plate S, in which the awl-bar slides, is pivoted to the end of the neck B at b', which point b' is in front of a line passing axially through the awl. After the awl has penetrated the leather, the plate S is vibrated in the direction of the arrow, Fig. 3, to produce the feed by a lever, T, which is pivoted at c' to the neck B, and carries at its upper extremity a roll, d', which is struck at the required time by the projecting portion 13 of the cam P. As soon as the portion 13 of this cam has passed out of contact with the roll d', which takes place when the awl has completed its ascent, the plate S is thrown out into the position seen in Fig. 3 by a coiled spring, e', Fig. 6, which bears against a pin, f'.

The amount of vibration of the plate S and awl a', and the consequent amount of feed, is regulated by a screw, g', which passes through a projection, h', on the lever T, and strikes against the frame B. By thus pivoting the plate S in front of a line passing axially through the awl, when the latter is vibrated to produce the feed, it is slightly raised in the arc of a circle, which tends to lift the material being sewed off the throat-plate, and thus lessen the friction between the two, and facilitate the operation of feeding the material. This feeding of the material takes place immediately after the needle has been driven to its lowest point, and slightly raised for the purpose of slackening the loop, as previously described, and while the presser-foot is raised from off the material.

U is the presser-foot, the shaft i' of which slides in vertical bearings in the end of the frame B, and has secured to it an adjustable dog, k', in which is fitted the end of a lever, V, which is pivoted to the frame B at 14, and upon this lever bears the end of a long flat spring, W, and thus through the connections described the presser-foot is held firmly down upon the material during the time that the awl is making the hole and the needle is in the material.

The pressure of the spring W upon the lever V is regulated by a screw, A'. As soon as the awl has passed through the material the presser-foot is raised, so as to leave the leather free to be fed, by the portion 15 of the cam Q striking a roll, l', on the lever V, and as soon as the feed is completed the portion 15 of the cam Q passes out of contact with the roll l', and the presser-foot is instantly forced down onto the material by the pressure of the spring W.

B¹ is the presser-foot lifter, which acts upon the lever V, and by which the presser-foot is raised when required for the removal of the material.

m' is a spring-bar, the upper end of which is secured to a block, n', while its lower end is bent, so as to form a thread-guide, o', which is provided with an eye, 16, and serves to carry the waxed thread p' into the hook 17 of the needle d, which is at the proper time brought up into a position to receive it through the hole made by the awl in the material being operated upon.

The waxed thread is led from the spool C' over the tension-wheel D', and through the eye 16 of the thread-guide, in the ordinary manner.

The thread-guide is operated so that the thread will be carried partially around the needle without coming into contact with the corners of the slot q' in the presser-foot, and will be held back of the needle while the material is being fed by two levers, E' G', the lower ends of which are bifurcated, so as to embrace the thread-guide bar m', and impart to the thread-guide a compound longitudinal and transverse motion partially around the needle.

The levers E' G' are pivoted to the frame B at 18 19, and are provided at their upper ends with pins 20 21, which fit into cam-grooves 22 23 in a block, H', which slides on and is guided by the presser-foot shaft i', and is secured to and driven by the awl-shaft R.

As the needle and awl rise, the thread-guide is moved by the lever E' from 24 to 25, Fig. 8. After the awl has risen above the plane of the thread-guide the latter is moved by the lever G' from 25 to 26, crossing the path of the needle, and carrying the thread against the front side thereof; and just before the needle commences to descend, the thread-guide is carried by the lever E' from 26 to 27, which conducts the thread under the hook of the needle and insures its being caught thereby.

As the needle continues to descend, the thread-guide retraces its path from 27 to 26, from 26 to 25, and from 25 to 24, and the thread is then held back of the needle, while the material is being fed, which prevents the thread from being drawn against the tension, and consequently no more thread will be drawn from the tension-wheel than is absolutely required to make the stitch, which enables me to dispense with the take-up spring heretofore employed; and the thread-guide being back of instead of being in front of the needle, as heretofore, the stitches may be readily seen by the operator as soon as they are formed.

The above-described peculiar traverse of the thread-guide causes the thread to be carried partially around the needle, as required, without coming into contact with the corners of the slot q' in the presser-foot, as has been the case in machines of this class as heretofore constructed, and which has prevented the application to the thread of a sufficient amount of tension to produce a tight stitch.

With my improved thread-guide, however, a sufficient degree of tension to produce a tight stitch may be applied without liability of breaking the thread or removing the wax therefrom, as it is not brought into contact with the corners of the slot q' of the presser-foot, and the slot q' can on this account be made much narrower than heretofore, causing it to hold the work more firmly and prevent it from being puckered or displaced.

The above-described machine is of simple construction, is not liable to get out of order, and requires a comparatively small amount of power to operate it—advantages not common in this class of machines.

*Claims.*

What I claim as my invention, and desire to secure by Letters Patent, is—

1. The thread-guide o', constructed and operated substantially in the manner and for the purpose described.

2. The slotted cast-off h, adjustable on its bar M by means of the screw i, as and for the purpose set forth.

3. The within-described mechanism, or its equivalent, for regulating the stroke of the needle in such manner as to insure the cast-off being always carried up into contact with the material without regard to the length of the loop, as set forth.

4. The spring N, provided with one or more friction-rolls, q, in combination with the cast-off bar M, operating substantially in the manner and for the purpose described.

5. The adjustable throat-plate O, constructed and applied to its supports substantially as set forth.

Witness my hand this 3d day of June, A. D. 1870.

EBEN A. KIMBALL.

Witnesses:
N. W. STEARNS,
L. E. BATCHELLER.